United States Patent
Reyna (10) Patent No.: US 7,210,120 B2
(45) Date of Patent: Apr. 24, 2007

(54) CLI CONFIGURATION DUMP COMMAND SUPPORT GENERATION

(75) Inventor: David Reyna, San Francisco, CA (US)

(73) Assignee: Wind River Systems, Inc., Alamedia, CA (US)

( * ) Notice: Subject to any disclaimer, the term of this patent is extended or adjusted under 35 U.S.C. 154(b) by 969 days.

(21) Appl. No.: 10/365,726

(22) Filed: Feb. 12, 2003

(65) Prior Publication Data

US 2004/0158621 A1    Aug. 12, 2004

(51) Int. Cl.
G06F 9/44     (2006.01)
G06F 13/00    (2006.01)
G06F 3/00     (2006.01)
G06F 11/00    (2006.01)

(52) U.S. Cl. .................. 717/106; 717/115; 719/320; 719/328; 714/2

(58) Field of Classification Search .................. None
See application file for complete search history.

(56) References Cited

U.S. PATENT DOCUMENTS

| | | | |
|---|---|---|---|
| 5,335,341 A * | 8/1994 | Chana ..................... 714/37 |
| 6,067,407 A * | 5/2000 | Wadsworth et al. ........ 709/224 |
| 6,108,300 A * | 8/2000 | Coile et al. ................ 370/217 |
| 6,442,448 B1 * | 8/2002 | Finley et al. ............... 700/231 |
| 6,591,376 B1 * | 7/2003 | VanRooven et al. .......... 714/36 |
| 6,728,847 B1 * | 4/2004 | Qin et al. ................... 711/162 |
| 7,065,768 B1 * | 6/2006 | Janzig et al. ............... 719/320 |

* cited by examiner

Primary Examiner—Antony Nguyen-Ba
(74) Attorney, Agent, or Firm—Fay Kaplun & Marcin, LLP (57) ABSTRACT

A method and system to generate a CLI command designed to output a configuration dump of a networked device is described. The method and system allows generation of a command that discovers the state value parameters of the device, and from those discovered state value parameters constructs a CLI command script that, when executed, sets the networked device back to the configuration existing when the command was initially executed. The method and system provides templates and routines that may be customized by the user to form a command specific to the networked device.

34 Claims, 5 Drawing Sheets

CLI CONFIGURATION DUMP COMMAND SUPPORT GENERATION

BACKGROUND INFORMATION

Modern computer networks resemble a web of communication lines that meet at a plurality of node points, such that any one node point may be reached from another node point along many different paths. Different types of devices are connected to the network at the nodes, to perform functions associated with network traffic or simply to send and receive data from the network. Some of the devices are routers, which forward network traffic along optimized paths. Other devices may include any type of network enabled device, which is able to communicate with other networked devices by exchanging data over the network.

Routers manufactured by the Cisco Systems Corporation are widely used. Cisco routers are managed by a Command Line Interface (CLI), which is a collection of text commands that are typically entered by the user at a command prompt, using a computer terminal. In general, routers are formed by powerful microprocessors, memory units and command consoles which allow a user to configure the manner in which the router directs the flow of network traffic according to the computed optimal paths. Other devices connected to the network may be configured so that they are capable of interacting with routers, and are often designed with CLI command sets that are compatible with the Cisco Internetworks operating system. In particular, applications used to remotely manage these devices, as well as the routers themselves, may be designed to be compatible with the Cisco CLI command set, to provide familiar commands and software organization to developers used to work with Cisco systems.

On occasions, the operation of the networked devices is disrupted by an abnormal condition, an unexpected event or other abnormality, and the networked device stops functioning normally. This abnormal condition, generally called a "crash", often requires a restart of the networked device in order to be resolved. The user may also attempt to improve the performance of the device by changing configurations, in which case each successive configuration can be referred to as a "candidate version" of the final desired configuration. It is often valuable to return the device to a known valid configuration, either in response to the conditions of the network that led to the failure, or to back out of a "candidate version" configuration known to be flawed.

The CLI commands used to set a device to one of these various configurations are typically placed into a script file, due to the complexity and volume of commands required to fully set a device's configuration. It is useful thus to generate a script file for an existing configuration of the device, so that the device can later be returned to that configuration. Generating such a script file typically is a complex and time consuming process, which needs to be repeated every time changes are made to the device's features or to the CLI command set.

SUMMARY OF THE INVENTION

In one exemplary embodiment, the present invention is a system which includes a code generator configured to generate code for an inverse handler, the inverse handler configured to discover a value of one of a number of state settings of a device, and generate at least one command usable to set the one of the number of state settings to the value. The code generator is also configured to generate code for a wrapper routine, the wrapper routine configured to invoke the inverse handler and receive from the inverse handler the at least one command, and to generate code for a configuration dump handler, the configuration dump handler configured to invoke the wrapper routine, receive the at least one command, and format the at least one command in an output format.

In a different aspect, the invention is a method for assisting construction of a configuration dump command for a networked device. The method provides an environment for configuring inverse handlers to discover initial state values of the device and generate CLI commands adapted to recreate the initial state values and for configuring wrapper routines to call the inverse handlers and provide iterative and guiding parameters to the inverse handlers. The provided environment also assists in generating a configuration dump handler adapted to call the wrapper routines in a selected order and to format an output comprising the CLI commands.

DETAILED DESCRIPTION

Figure 1:
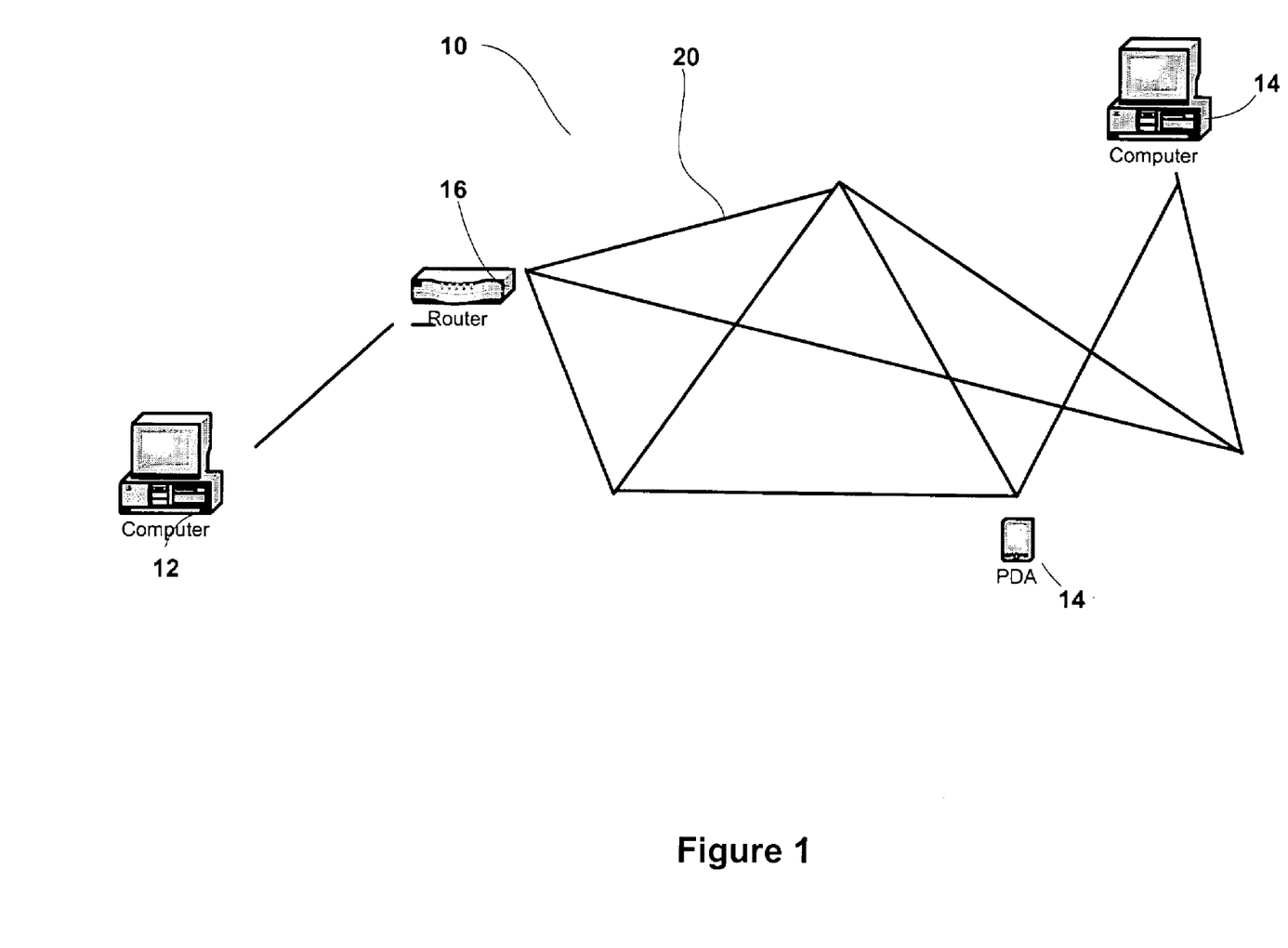
FIG. 1 shows a diagram of an exemplary data network with devices connected thereto.

The present invention may be further understood with reference to the following description of preferred exemplary embodiments and the related appended drawings, wherein like elements are provided with the same reference numerals. As indicated above, computer data networks may be used to connect various devices that have different functions and characteristics. Routers are used to determine the optimal path follower by network traffic to travel from one networked device to another networked device. FIG. 1 shows a schematic representation of such a network 10 in which a source device 12 is connected to destination devices 14 via a data network 20. In this representation a router 16 is shown, which may be thought of as an interface between device 12 and network 20. Both source device 12 and destination devices 14 may be any networked device, such as a network enabled cell phone, a PDA, a computer, or any other device with the ability to exchange information over a data network. Network 20 may be a Local Area Network (LAN), a Metropolitan Area Network (MAN), a Wide Area Network (WAN), a corporate intranet or the Internet.

Figure 2:
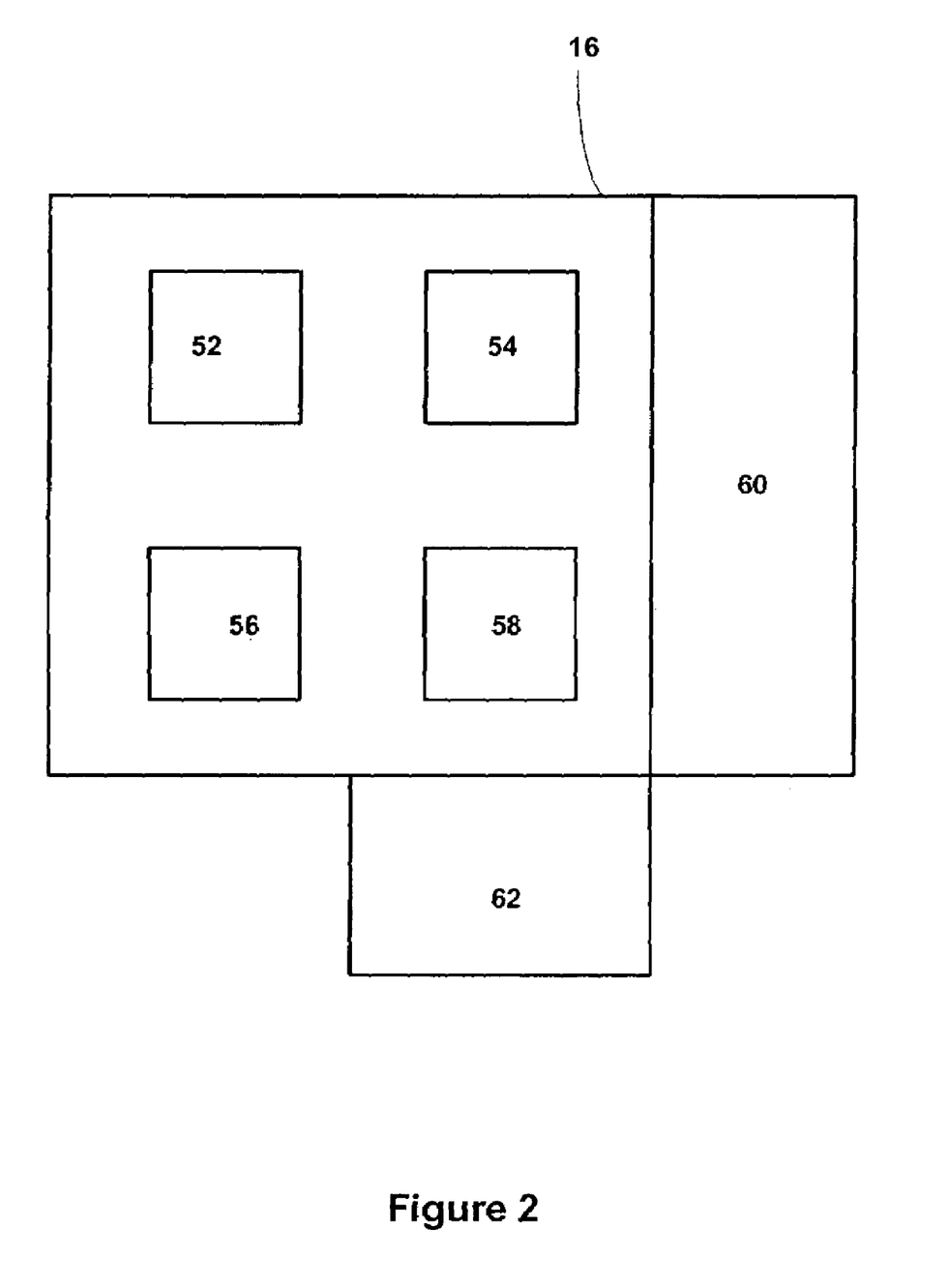
FIG. 2 shows a schematic diagram of an exemplary device connected to a data network.

FIG. 2 shows a schematic diagram of the hardware architecture found in an exemplary networked device, in this case a router. Networked devices 12 and 14 may have a simpler architecture, and may only include some of the elements described in FIG. 2. In this example, random access memory (RAM) 52 forms the principal data storage element of router 16. RAM 52 for example may contain the running configuration of the device, which in the case of a Cisco router operates under the Cisco Internetwork Operating System (IOS) software operating system. The running configuration is the configuration that the router is actually running, and which may be modified during operation of the router. This is in contrast to the startup configuration, which is stored in a non volatile memory, and is not routinely modified during use.

Some type of RAM 52 is likely to be present in simpler networked devices, to contain run-time information of the device. A non-volatile RAM (NVRAM) element 54 may also be provided in router 16 as well as in other devices. NVRAM 54 contains the startup configuration, which is a backup of the device's configuration that is available for restart if the router is turned off or loses power, but which may not contain up to date information. Flash memory 56 may be another element of router 16, which holds a copy of the router's operating system, for example the Cisco IOS software. Flash memory 56 may be erased and reprogrammed with an appropriate procedure, but otherwise retains the information it contains. Read only memory (ROM) 58 contains an initialization program that is executed when the router 16 is started, to starts up the operating system.

Networked devices that are configured to be remotely managed over the network may contain two other components. Interfaces 60 may be provided to connect with the data networks, and provide the connections through which network traffic enters and exits the device, such as router 16. Interfaces 60 may support Ethernet, Token Ring and other types of network connections. A console 62 may be available to allow a user to enter commands into router 16, such as manual configuration commands. Console 62 may be a port to which a terminal emulation microcomputer is connected, or another type of connection which allows an input device to be connected so that commands can be issued. In the context of this application, the term "console" will be used to refer generally to means to enter commands and data into the device.

To improve flexibility, an user may wish to have several alternate configurations of the device, for example to adapt to changing conditions of the environment in which the device is operating. The user may also attempt to improve the performance of the device by changing configurations, in which case each successive configuration can be referred to as a "candidate version" of the final desired configuration. The commands used to set a device to one of these various configurations are typically placed into a script file, due to the complexity and volume of commands required to fully set a device's configuration.

One difficulty may arise in generating a configuration script file that represents the current state of the device, so that the current state of the device can be obtained again by executing the script file. This script file can thus be used to return the device to the starting configuration after arbitrary configuration changes have been made. This configuration file is typically called a "Configuration Dump". A CLI command on the device that will generate this file is typically called the "Configuration Dump Command". It is a very complex process to create the code to accomplish the generation of a CLI script that represents the current state of the device. It is typically difficult to add automation for parts of this process, even having knowledge of the CLI command set of the device. It is also typically difficult to provide a solution to generate the "Configuration Dump Command" that can easily accommodate new or changed features of the device, and changes in the respective CLI command set.

Figure 3:
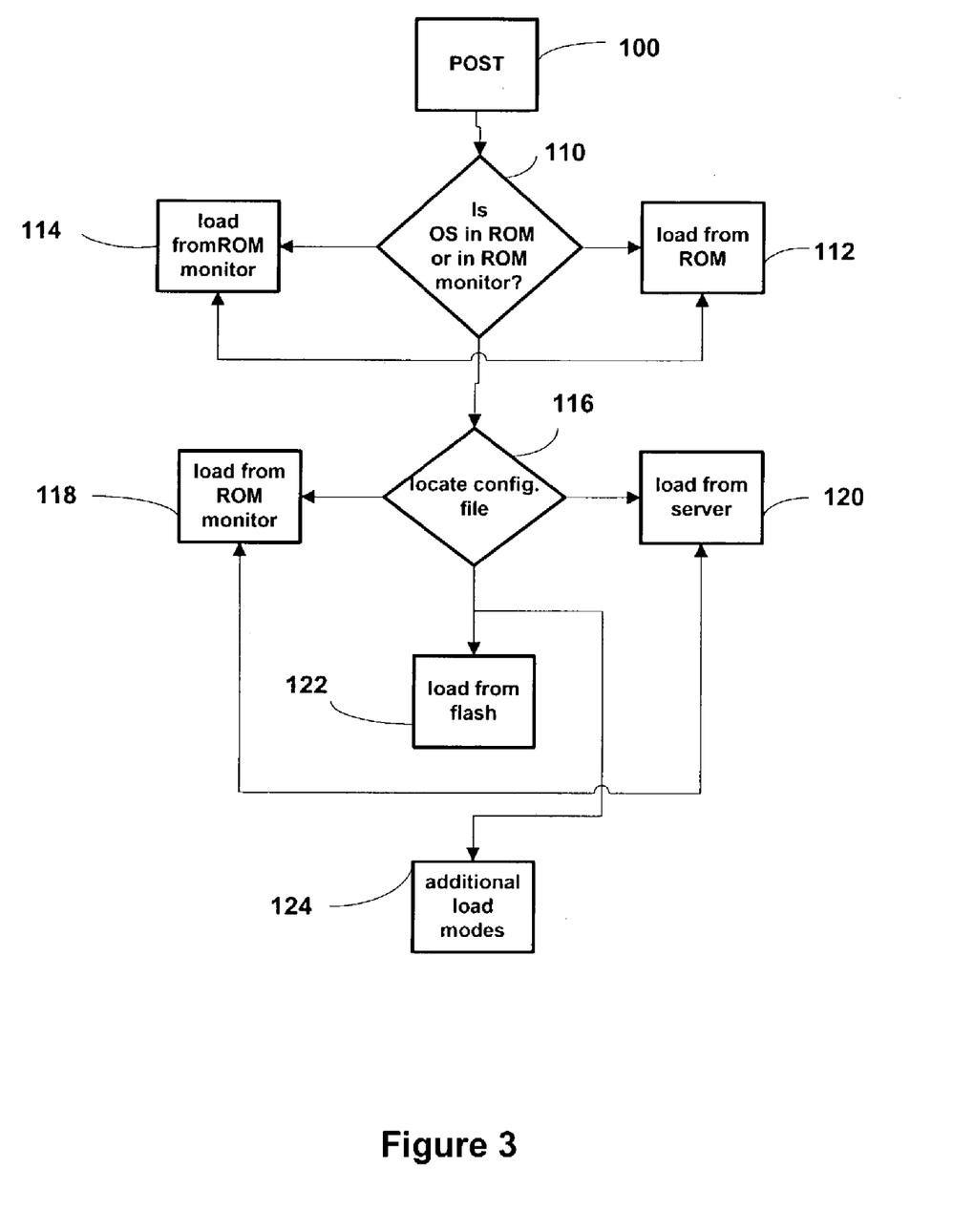
FIG. 3 is a flow chart showing an exemplary initialization procedure for a networked device, according to the present invention.

When a networked device such as a router is started up, either from a normal shutdown or from an abnormal "crash", several steps are taken by the machine, which partially depend on user specified settings and on the information available to the device. FIG. 3 shows an exemplary startup sequence for a router. After the power on self test (POST) is completed in step 100, the router looks in the configuration register in step 110 to determine where to find the operating system. If the boot sequence is interrupted there, the router may enter a ROM monitor mode in step 114, where the router may be manually reconfigured. Alternatively, the router may be allowed to boot using the image file containing the operating system found in ROM in step 112, or may be configured to retrieve user supplied information on where the operating system may be found.

After the operating system is loaded, in step 116, the router looks for a configuration file, specifically the startup configuration stored in NVRAM. Since the startup configuration file does not typically represent the latest configuration which was used by the router, particularly if the router was shut down abnormally, the user may want to specify an alternate configuration file to be used during this phase. This file may be, for example, the configuration dump file that is generated using the configuration dump command, as will be described below. For example, a configuration file corresponding to the latest running configuration may be loaded using the ROM monitor mode in step 118, using a flash memory device in step 122, or may be obtained via a trivial file transfer protocol (TFTP) server (step 120). Depending on the set up of the device, additional modes of loading the configuration file may be provided in step 124, such as from a memory location connected to the device via a data network. Once the configuration initialization is completed, the device is ready to begin operation.

It is possible to modify the running configuration of the networked device while it is operating, by using a command line interface (CLI) of the device's operating system. A CLI interface may also be used to issue commands that control the loading of the configuration file, and control other functions such as generating a configuration dump file containing the latest running configuration. These commands may be issued remotely through the data network connection. The CLI interface compatible with Cisco-type routers may have different access levels, which give the user access to more or less restrictive sets of commands, depending on the authorization level of the user. For example, the ability to configure or manage a router may be limited to certain users by password protection. CLI commands within a Cisco-type infrastructure are hierarchically structured, for example as part of a CLI command tree, and the commands and options available may vary depending on the point within the hierarchical structure where the commands are issued. If the user wants to configure the device, for example, the user has to reach the configuration branch of the CLI tree structure before the configuration commands are available. To simplify using the CLI interface, the prompt seen by the user changes to indicate the current position within the CLI tree.

The CLI interface described above may also be used to manage the operation of a router, or more generally of any networked device that can be managed using a network-based device management application. One example of such a management application is the WindManage™ integrated device management solution, developed by Wind River Systems of Alameda, Calif.. Management applications like this enable manufacturers of networked devices to easily incorporate a wide range of remote management capabilities into their products. The development process of the management interfaces is simplified since the same interface may be customized across different product releases and different devices, without extensive re-engineering of the management interface. In particular, the remote management interface may be used to issue commands to the device across a network to generate a configuration dump, which the remote user may direct to be stored in a desired memory location.

According to embodiments of the invention, the remote management application implements a Cisco-like configuration dump command (config-dump), which is carried out using a CLI interface. The output of the config-dump command may be directed to the console of the networked device, such as console 62 of router 16 described above. This may include a display for viewing of the output by the user. The output itself consists of a series of CLI commands, which can be re-executed by the networked device to bring the device to the same configuration it was in at the time the config-dump was generated. The user may re-direct the output of the config-dump command to another location, such as a memory storage. For example, the output may go to a disk file, flash memory, other non-volatile storage on or off the device, or to a different location on the data network. During re-start of the device, as explained above with reference to a router's initialization, the config-dump file may be invoked and used as the configuration file used by the operating system of the networked device to set up the device.

The implementation of the config-dump command may allow for different, limited levels of configuration capture, such as administrative capture and user capture. This feature is also in concord with the multi level nature of the Cisco-compatible CLI commands. The config-dump command implementation according to embodiments of the invention allows the developer to easily generate a config-dump command that is always current as the device is operated and also as revisions are made to the coding of the device's operating system. This greatly simplifies development and updates of the device's coding, since the developer does not have to manually examine the CLI command set of the device, research a methodology to generate a configuration dump, and then develop code that produces the desired result for the specific operating system and iteration of the device.

As indicated, some requirements for the config-dump command according to embodiments of the invention include compatibility with Cisco operating systems and network devices, such as routers. The general use and output of the present command also is preferably similar to that of the Cisco-like Configuration Dump command. The present solution thus must be fully compatible with existing Cisco examples. From this requirement is derived the need to generate a config-dump command based on the CLI command set. In addition, the command feature must be compatible with existing remote management utilities, such as WindManage™. One reason for using a Cisco-like command is to present to the developer a command format and logic with which he is familiar, since Cisco routers and protocols are well known in the art.

More specifically, the config-dump command according to embodiments of the invention follows the following functional requirements. One primary requirement is the generation of a CLI script in the form of CLI commands. The script is derived from the configuration of the device at generation time, such that when the CLI script is executed at a later time, the device will be restored to the configuration existing when the CLI script was generated. In one exemplary embodiment, the configuration dump utility that generates the CLI script is itself invoked using a CLI command. The configuration dump utility also preferably provides to the user options on the type of state information that is preserved in the CLI script. For example, these options may be selected by optional command line parameters that are included in the configuration dump CLI command. In addition, the output of the script may be directed to different destinations, as desired by the user, depending on the capabilities of the device. For example, the output CLI script may be stored in disk files, in non volatile storage memory, through a TFTP connection, or via the console port of the device. From there, the output may be further redirected to another destination.

The exemplary configuration dump according to embodiments of the present invention supports the typical requirements of a CLI command set. For example, it supports CLI intermediate modes and required parameters, optional parameters and iterative parameters such as table row selectors. The command also will support line-feed (LF) terminated output lines, as well as CR-LF line terminators. The configuration dump command can be used flexibly in a modular and hierarchical solution, and may be scalable to large CLI command sets and to complex devices. The user is given the ability to modify and adjust, to a certain extent, the code generation and other development support features of the command. The user is given a framework within which to form the solution, but is not forced into a single rigid solution method. The generation of a solution to form the CLI script from the configuration dump preferably uses the knowledge inherent in the CLI tree, due to its hierarchical format, to help automate the process of creating the command. For example, intermediate modes may be used to reduce the length of CLI command strings that have to be generated by the configuration dump command.

One important aspect of generating a configuration dump CLI script involves the use of handlers. Handlers are functions that perform certain operations when executed, depending on the specific input parameters and commands that are provided to the handler. According to the invention, the handlers are CLI handlers that perform functions in response to CLI commands. The handlers may be information handlers that display information obtained from the device, or control handlers that are used to change the state of the device in some manner. The control handlers are principally used to generate a CLI script with the configuration dump command. The parameters supplied to the handlers may be of different types. Iterative parameters are those that may be used to specify a certain row in a table, for example. Iterative parameters are used for looping through indexed values, as in the case of a one or multi dimensional matrix, an array, or similar set of elements. Steering parameters, together with their associated parent command nodes, are used to guide the general operation of the handler, for example by calling the handler for each one of a set of defined elements. Value parameters are passed into the handler and are used to set state values. These are the parameters that must be discovered at runtime, so that an equivalent configuration dump output may be created. When the output is executed as a set of CLI commands, the value parameters are re-set in the device.

According to the invention, in addition to the "normal" CLI handlers there are also "inverse" handlers, also referred to as "discovery" handlers. One inverse handler may be provided for each of the state setting, normal CLI handlers. Whereas the state setting handler receives parameters and sets a state of the device accordingly, the respective inverse handler receives iterative and steering parameters, discovers the state of the device, and generates a CLI command string that is capable of recreating the discovered state. Inverse handlers can be used as part of the configuration dump command, since they allow the function to return the actual CLI code that, when executed at a later time, will bring the device back to the state existing when the command was invoked.

Another element of the configuration dump command includes the wrapper routines for the inverse handlers. The wrapper routines are used to set up the appropriate steering parameters for the respective inverse handlers. For example, the wrapper routine may be used to generate a call for each enumeration of the steering parameters, and may be used to set up the repetitive loops of the iterative parameters. More generally, the wrapper routine is capable of understanding the requirements of its respective inverse handler, and invokes it at the appropriate time, while supplying the inverse handler with the appropriate parameters. The wrapper routine may be invoked by the ConfigDump handler, further described below, or by other wrapper routines related to the inverse handler. The basic function of the wrapper routines is to help provide modularity in the ConfigDump commands, and to simplify the coding of the ConfigDump handler.

The ConfigDump handler is the master code, or the shell, that when executed generates the configuration dump for the device. When the user desires to generate the configuration dump, which is the set of CLI commands that reflects the current state of the device, the ConfigDump handler is invoked to execute the various code elements that produce the desired output. The ConfigDump handler may generate the header, and may format and print simple information identifying the configuration dump that is being generated. The wrapper routines described above are called from the ConfigDump handler, so that they may generate the required state information. The ConfigDump handler is also configured to insure that the wrapper routines are called in the proper order, particularly of importance in cases where there are dependencies between the wrapper routines and the respective handlers.

Figure 4:
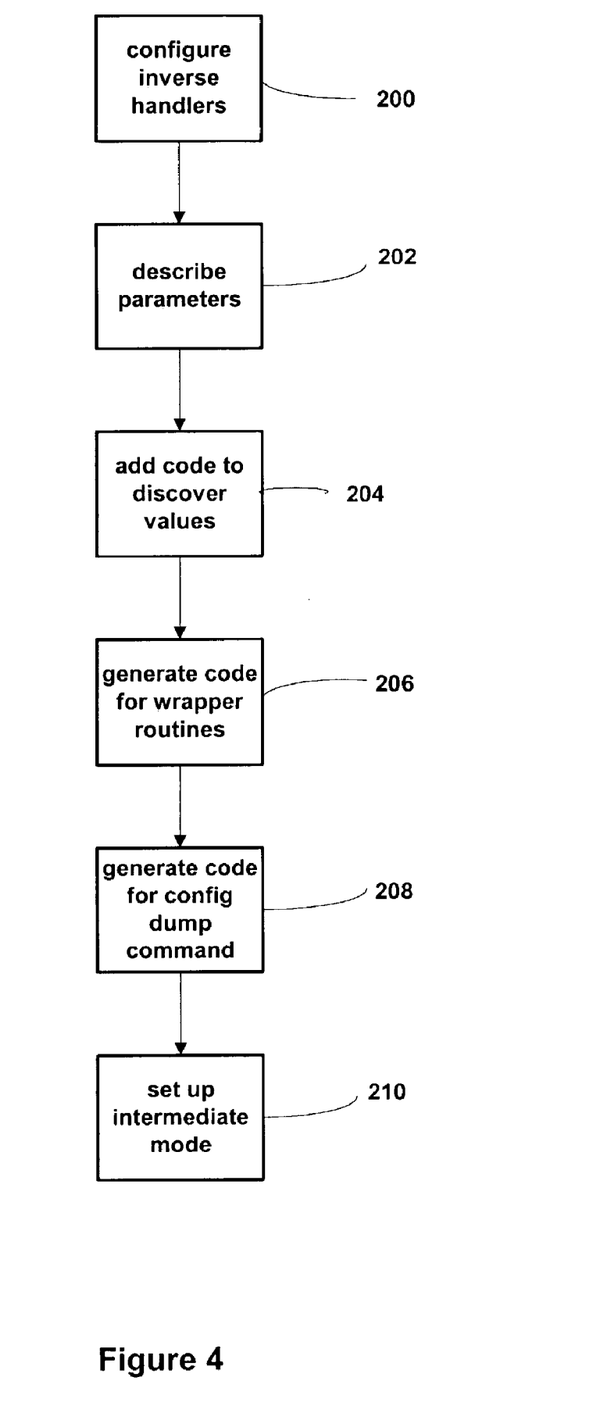
FIG. 4 is a flow chart showing an exemplary process used to generate a configuration dump command, according to the present invention.
Figure 5:
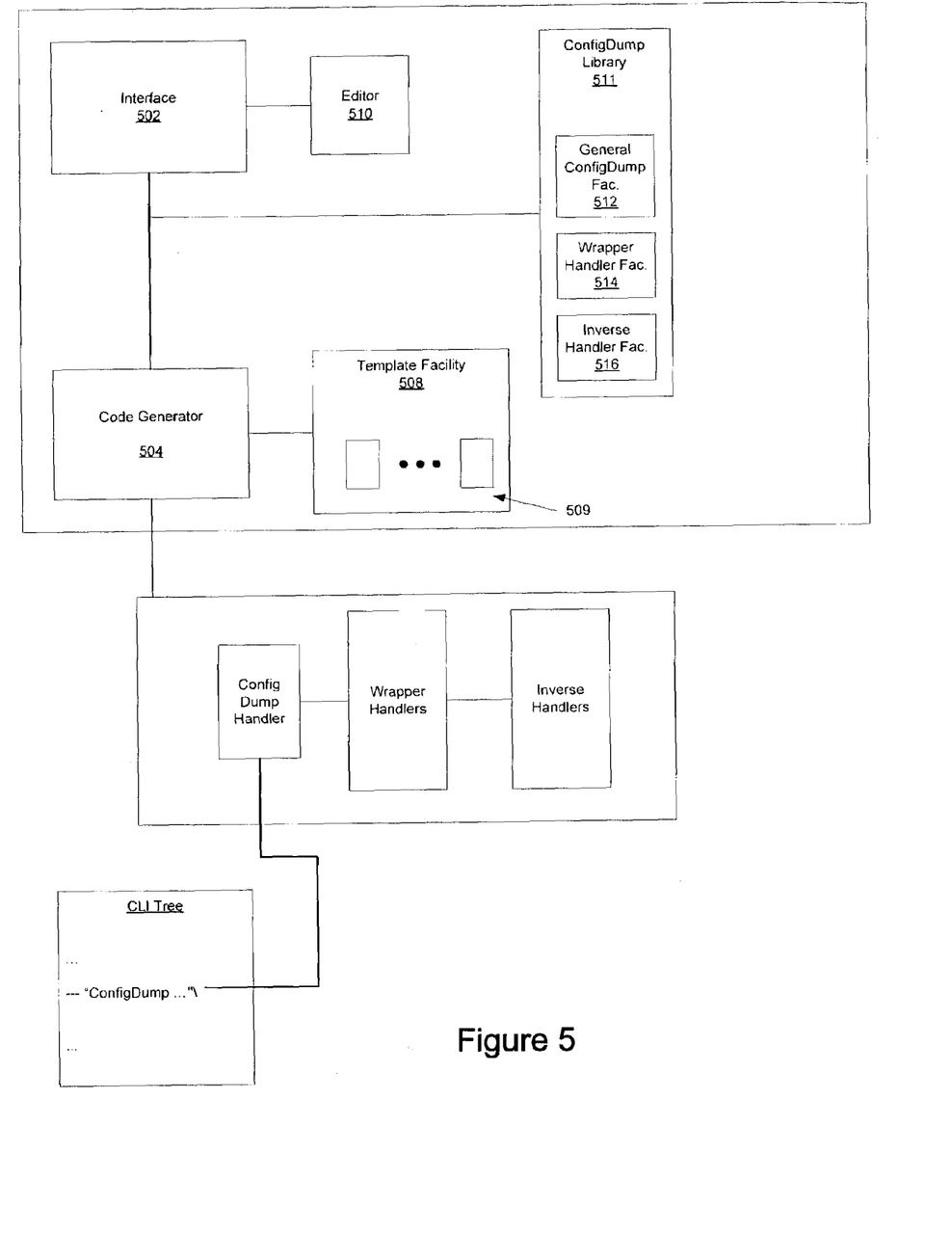
FIG. 5 is a diagram of the modules used in generating a configuration dump command according to an embodiment of the present invention.

The creation of the ConfigDump output is described for an exemplary embodiment of the present invention with reference to FIG. 4 and FIG. 5. The system according to the present invention, as illustrated in FIG. 5, provides an environment 500 which assists the developer in carrying out the following tasks. In an initial step 200, the inverse handlers are configured. In this step, the developer attaches parameters to the handlers, and specifies if each parameter is required or optional. The parameter type may be shown in a column of an interface 502, to indicate whether each parameter is required or optional for normal state handlers. In addition, virtual parameters may be specified for inverse handlers. Virtual parameters allow the Config-Dump handler, or more often the wrapper handler, to pass internal iterative or guiding parameters to an inverse handler. In one embodiment, a check box may be provided to let the user specify whether or not to generate an inverse handler corresponding to a normal CLI state handler.

A new parameter attribute column may be provided in interface 502 in step 202 to let the user indicate what type of parameter is being attached to the handler. The choices in the attribute column of the parameters may include iterative parameters, indicating that the parameter provides loop control support to the wrapper handler, and guiding parameters, to indicate that the parameter values should be provided to the inverse handlers and should be enumerated as needed by the wrapper handler. A value column may be provided to set up pointers in the inverse handler, to assign locations where to place the initial state values discovered by user supplied code. In addition, a column for "other" parameters may be provided in interface 502. When "other" parameters are specified, code is set up in the wrapper routine and in the inverse handlers to pass and receive these parameters respectively.

The code generation for the inverse handlers is performed in step 204, using code generator 504. The exemplary inverse handlers use the same API as the normal CLI handlers, and thus can use the same API calls to retrieve input parameters. At this point code is provided to retrieve the parameters, in particular those other than the value parameters. A section is provided in which the user may add the appropriate code needed to discover and set the value parameters. Another section may be provided to let the user insert code that returns the output CLI command, and that formats that CLI command as the output of the inverse handler. This process is repeated for all the inverse handlers that correspond to the normal CLI state handlers that have been selected by the user.

In step 206 the user is prompted to leave environment 500 to generate the code necessary for the wrapper routines, using code generator 504. Each wrapper routine, for example, is configured to set up the parameters necessary to perform calls to the inverse handler. Each wrapper routine also sets up the loops necessary to process iterative parameters by recursively calling the inverse handler. In the case of a guiding parameter that is an enumeration parameter, then the wrapper routine generates separate calls for each registered enumeration value of the parameter.

In step 208 the ConfigDump handler is generated. Support is provided to assist the developer in creating the Config-Dump command itself. The developer is prompted to set up and order the commands for the configuration dump, however the system according to the present invention provides editing tools 510 that assist the developer in writing the handler. For example, a drag and drop menu driven system may be provided to list all inverse handlers and wrapper routines that are necessary to develop the ConfigDump handler. Once all the necessary handlers have been created, the developer may be notified that the generation of required handlers is complete.

API calls to set up an intermediate mode are provided in step 210. Here, an intermediate mode command may be added to the output script. The inverse handler return strings are edited to remove the intermediate prefix, so that the returned string may be used as a CLI command. A method to exit the intermediate mode may also be provided at this point in the code generation. Intermediate mode, as described above, allows the use of shortened CLI commands. Since the command syntax reflects the place of the command in the CLI command tree hierarchy, the prefix part of the command may be omitted if the location of the command in the command tree is known. However, the inverse handler is set up to build generic commands, that include the prefix of a complete CLI command. To use those complete CLI commands in intermediate mode, the prefix must be removed from the command line.

All code generation according to embodiments of the present invention is carried out using a template generation facility 508. This approach simplifies code generation by allowing the users to provide their own templates 509, that are specifically suited to the particular devices for which the user wants to generate a Config-Dump command. Various default templates 509 may also be provided, for cases where a user template is not available or appropriate. Using templates simplifies code generation when changes are made to the devices or to the operating system of the devices. In case of changes, only the templates 509 need to be modified, without having to recompile the entire command generation software package.

To support the generation of the embedded code, facilities are provided according to the invention in which various routines may be provided to the developer. These routines may be stored in a library, such as a ConfigDump API library 511, and may be separated, for example, into three groups: a General Config Dump facility containing ConfigDump support routines, a Wrapper Handler facility, containing wrapper handler support routines, and an Inverse Handler facility containing inverse handler support routines. The General Config Dump facility 512 is used for the Config-Dump command in general. It may include a write line routine used in the ConfigDump handler and at the end of the inverse handlers to remove any intermediate mode prefixes, as well as to control the redirection of the output. An intermediate define routine may be provided to set the string prefixes for commands generated for use in the intermediate mode. If the string is left empty, text is generated to command an exit from the intermediate mode.

The Wrapper Handler facility 514 is intended to assist the developer in setting up the necessary structures to call the inverse handlers. In this context, library functions may be provided to carry out the following tasks. The library functions may create an empty parameter list for an inverse handler, add a parameter name and value pair to the parameter list, delete the temporary parameter list structure, and create a temporary environment structure for an inverse handler. In addition, library functions may be provided to delete the temporary environment structure, create a buffer for the inverse handler's string output, and to delete the temporary output buffer. The Inverse Handler facility 516 may include, for example, a line template routine that returns a runtime version of the command line's text. This allows the inverse handler's output text to be non-static, so that a current version of the desired CLI script, reflecting the latest configuration of the device, may be generated at any time. In the exemplary embodiment, the inverse handlers use the same CLI as the regular CLI handlers.

More specific examples of the templates described above are shown below. For example, a template useable for a normal CLI handler may include steps to create pointers for the incoming parameters, steps to add code that retrieves the required and the optional parameters, and code that retrieves global variables associated with the parameters. These global variables may be, for example, the WindMarks™ used in the WindManage™ suite developed by Wind River Systems, of Alameda, Calif. The template may also provide for the addition of code by the user, in which the user maps the parameters to the internal elements of the device being remotely managed. Finally, the template may allow addition of code that sets the indicated global parameters. A different template may be offered for generation of an inverse handler. This template may include creating the pointers for the incoming and the local value parameters, and may have steps for adding code that retrieves the steering, iterative and virtual parameters. A section may be provided where the user adds code to discover the value parameters from the device, and another section where code is added to obtain the command line template and to incorporate the results into the CLI script outputted by the config-dump command.

Additional templates may be provided to facilitate the generation of the ConfigDump command by the user. For example, a wrapper handler template may be provided, which contains steps to set up a temporary environment structure, parameter list and output buffer for the wrapper routine. Loops may be set up for iterative parameters, and steering and virtual parameters may be set up in a subsequent step. The user may then be prompted to fill in a section of code in which the user provides the needed parameters. The template may then include steps to call the inverse handler, close any loops that were set up, and release the temporary structures and buffers. In the case where one or more of the steering parameters are enumerated parameters, the calls to the inverse handler may be repeated to set up the parameter for each enumerated value. A general template for the entire ConfigDump Handler may also be provided, although this may consist simply of an empty CLI handler, since no code generation is necessary by the developer for the command handler. For example, an empty user section may be provided where the user can organize the necessary code. Pull down menus may be provided, listing the already defined Inverse Handlers and Wrapper Handlers, as well as the handlers yet to be defined which require definition.

In the preceding specification, the present invention has been described with reference to specific exemplary embodiments thereof, in particular with specific references to Cisco routers. However, it will be apparent to those skilled in the art that the present invention is applicable to any networked device that can be remotely managed. It will therefore be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:
   a code generator configured to
      generate code for an inverse handler, the inverse handler configured to discover a value of one of a number of state settings of a device, and generate at least one command usable to set the one of the number of state settings to the value,
      generate code for a wrapper routine, the wrapper routine configured to invoke the inverse handler and receive from the inverse handler the at least one command,
      generate code for a configuration dump handler, the configuration dump handler configured to invoke the wrapper routine, receive the at least one command, and format the at least one command in an output format.

2. The system of claim 1, further comprising:
   a template facility including an inverse handler template, a wrapper routine template and a configuration dump handler template;
   wherein the code generator is configured to generate code for the inverse handler according to the inverse handler template, generate code for the wrapper routine according to the wrapper handler template, and generate code for the configuration dump handler according to the configuration dump handler template.

3. The system of claim 1, further comprising:
   an interface configured to allow a first parameter associated with the inverse handler to be specified;
   wherein the inverse handler is further configured to receive the first parameter, and the wrapper routine is further configured to provide the first parameter to the inverse handler.

4. The system of claim 3, further comprising:
   an interface configured to allow a second parameter associated with the wrapper routine to be specified;

wherein the wrapper routine is further configured to receive the second parameter, and the wrapper routine is further configured to invoke the inverse handler based on the second parameter.

5. The system of claim 4, wherein the second parameter includes at least one of a steering parameter and an iterative parameter.

6. The system of claim 1, further comprising:
an inverse handler facility configured to provide first support routines for code generation of the inverse handler;
a wrapper routine facility configured to provide second support routines for code generation of the wrapper routine; and
a configuration dump facility configured to provide third support routines for code generation of the configuration dump handler.

7. The system of claim 1, wherein the inverse handler includes command line interface commands usable to discover the value.

8. A device having a number of state settings, comprising:
an inverse handler configured to receive at least one parameter, discover a value of one of the number of state settings, and generate at least one command usable to set the one of the number of state settings to the value;
a wrapper routine configured to invoke the inverse handler, provide to the inverse handler the at least one parameter and receive from the inverse handler the at least one command;
a configuration dump handler configured to invoke the wrapper routine, receive from the wrapper routine the at least one command, and format the at least one command in an output format; and
a configuration dump command configured to invoke the configuration dump handler.

9. The device of claim 8, further comprising:
a command line interface tree which includes a number of commands, wherein the configuration dump command is one of the number of commands and the at least one command is another one of the number of commands.

10. The device of claim 8, further comprising:
an output facility configured to direct output of the at least one command by the configuration dump handler to a specified output device.

11. The device of claim 10, wherein the output device is one of a console, a disk, a flash memory and a data network connection.

12. A method, comprising:
generating code for an inverse handler, the inverse handler configured to discover a value of one of a number of state settings of a device, and generate at least one command usable to set the one of the number of state settings to the value;
generating code for a wrapper routine, the wrapper routine configured to invoke the inverse handler and receive from the inverse handler the at least one command;
generating code for a configuration dump handler, the configuration dump handler configured to invoke the wrapper routine, receive the at least one command, and format the at least one command in an output format.

13. The method of claim 12, wherein generating code for the inverse handler includes using an inverse handler template, generating code for the wrapper routine includes using a wrapper handler template, and generating code for the configuration dump handler includes using a configuration dump handler template.

14. The method of claim 12, further comprising:
receiving a specification of a first parameter associated with the inverse handler;
wherein the inverse handler is further configured to receive the first parameter, and the wrapper routine is further configured to provide the first parameter to the inverse handler.

15. The method of claim 14, further comprising:
receiving a specification of a second parameter associated with the wrapper routine;
wherein the wrapper routine is further configured to receive the second parameter, and the wrapper routine is further configured to invoke the inverse handler based on the second parameter.

16. The method of claim 15, wherein the second parameter includes at least one of a steering parameter and an iterative parameter.

17. A method for constructing a CLI command which generates a configuration dump of a remotely managed device, comprising:
providing a module to assemble code to discover initial state values of the device;
providing a module to assemble code to generate CLI commands to restore the initial state values of the device; and
providing a module to assemble code to specify a storage destination for the CLI commands.

18. The method according to claim 17, further comprising providing a module to assemble code to construct an inverse handler which discovers the initial state values of the device, and generates value parameters corresponding to the initial state values.

19. A method for assisting construction of a configuration dump command for a networked device, comprising providing an environment for:
configuring inverse handlers to discover initial state values of the device and to generate CLI commands adapted to recreate the initial state values;
configuring wrapper routines to call the inverse handlers and provide iterative and guiding parameters to the inverse handlers; and
generating a configuration dump handler adapted to call the wrapper routines in a selected order and to format an output comprising the CLI commands.

20. The method according to claim 19, further comprising generating inverse handlers corresponding to selected normal CLI handlers of the device.

21. The method according to claim 19, further comprising generating an interface for the inverse handlers to retrieve input parameters.

22. The method according to claim 19, further comprising providing a customizable module of the inverse handlers adapted to discover initial state values describing a configuration of the device.

23. The method according to claim 19, further comprising providing a customizable module of the inverse handlers to build hierarchical CLI tree commands which corresponds to the initial state values.

24. The method according to claim 19, further comprising setting up iteration loops of the wrapper routines to process iterative parameters passed to the inverse handlers.

25. The method according to claim 19, wherein the wrapper routines repeatedly call the inverse handlers to process enumerated parameters.

26. The method according to claim 19, further comprising providing an editing tool to assist in generating the configuration dump handler.

27. The method according to claim 26, wherein the editing tool provides a listing of existing inverse handlers.

28. The method according to claim 26, wherein the editing tool provides a listing of required inverse handlers.

29. The method according to claim 19, further comprising providing user customizable templates of the inverse handlers.

30. The method according to claim 29, wherein the user customizable templates of the inverse handlers allow insertion of user code to discover the initial state values of the device.

31. The method according to claim 19, further comprising providing user customizable templates of the wrapper routines.

32. The method according to claim 19, further comprising providing user customizable templates of the configuration dump handler.

33. The method according to claim 19, wherein formatting the output comprises directing the output to a selected storage location.

34. The method according to claim 19, further comprising configuring the configuration dump handler to be invoked remotely through a network connection of the networked device.

* * * * *